W. F. FOLMER.
AVIATOR'S CAMERA.
APPLICATION FILED APR. 5, 1917.
1,236,419.
Patented Aug. 14, 1917.
3 SHEETS—SHEET 1.
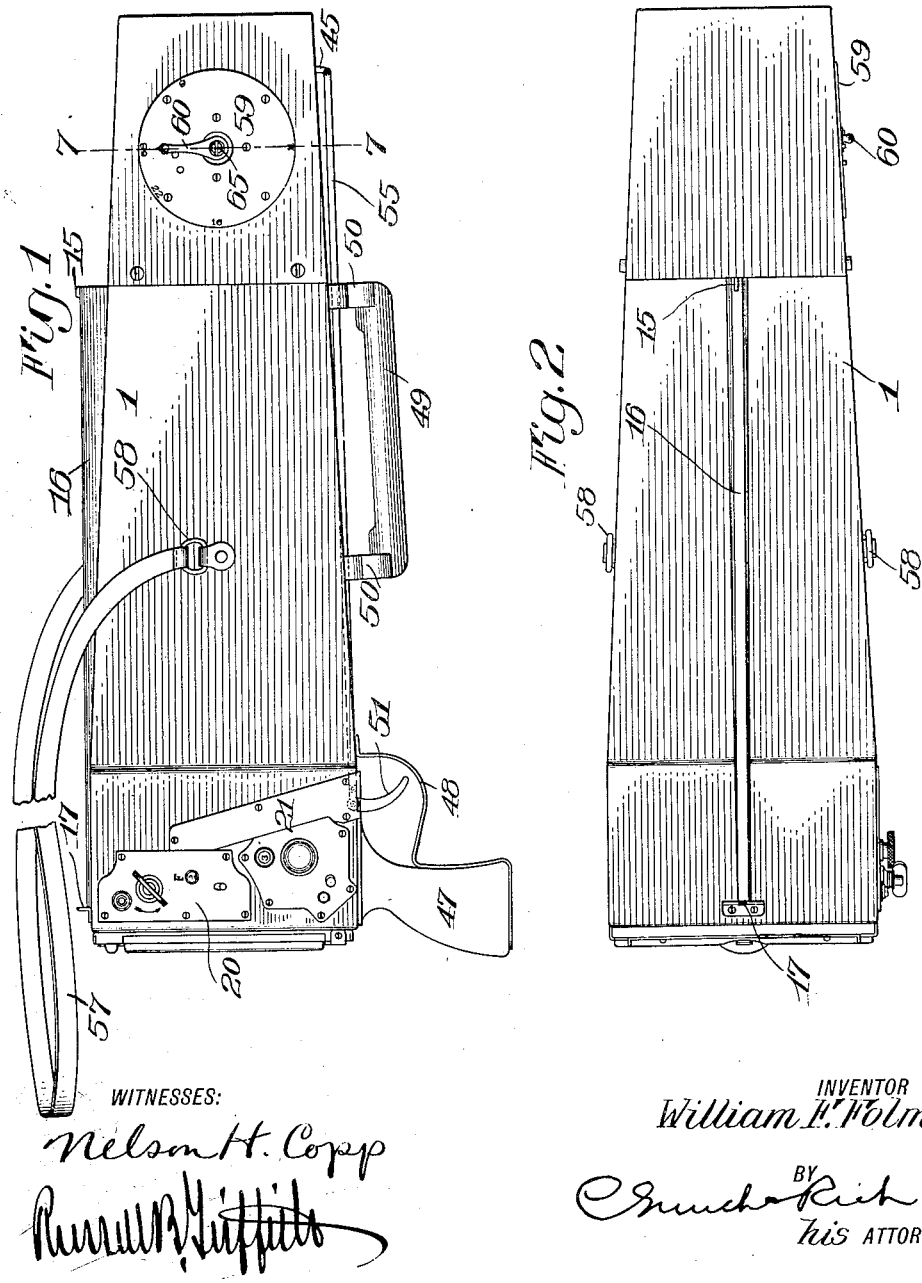
WITNESSES:
INVENTOR
William F. Folmer
BY
his ATTORNEYS W. F. FOLMER.
AVIATOR'S CAMERA.
APPLICATION FILED APR. 5, 1917.
1,236,419.
Patented Aug. 14, 1917.
3 SHEETS—SHEET 2.
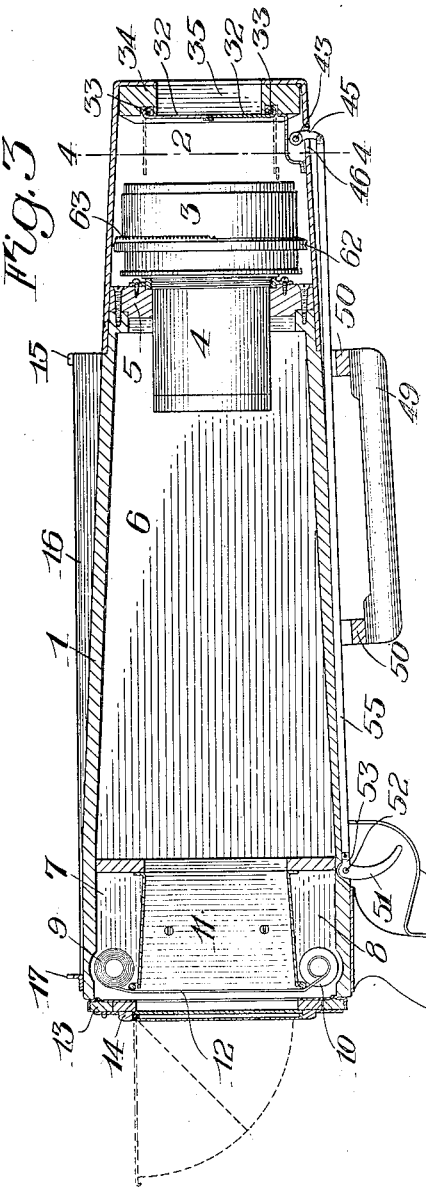
INVENTOR
William F. Folmer
BY
his ATTORNEYS W. F. FOLMER.
AVIATOR'S CAMERA.
APPLICATION FILED APR. 5, 1917.
1,236,419.
Patented Aug. 14, 1917.
3 SHEETS—SHEET 3.
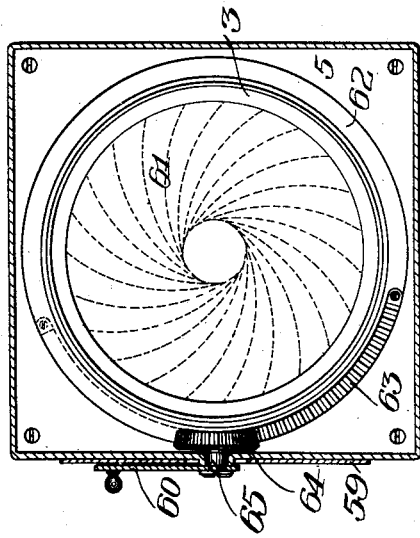
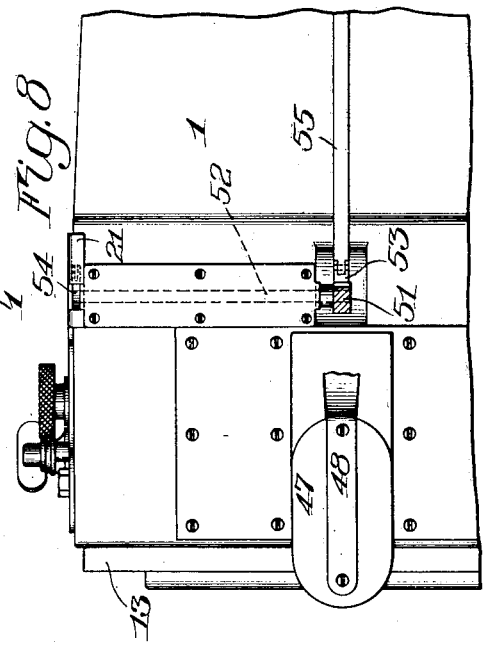
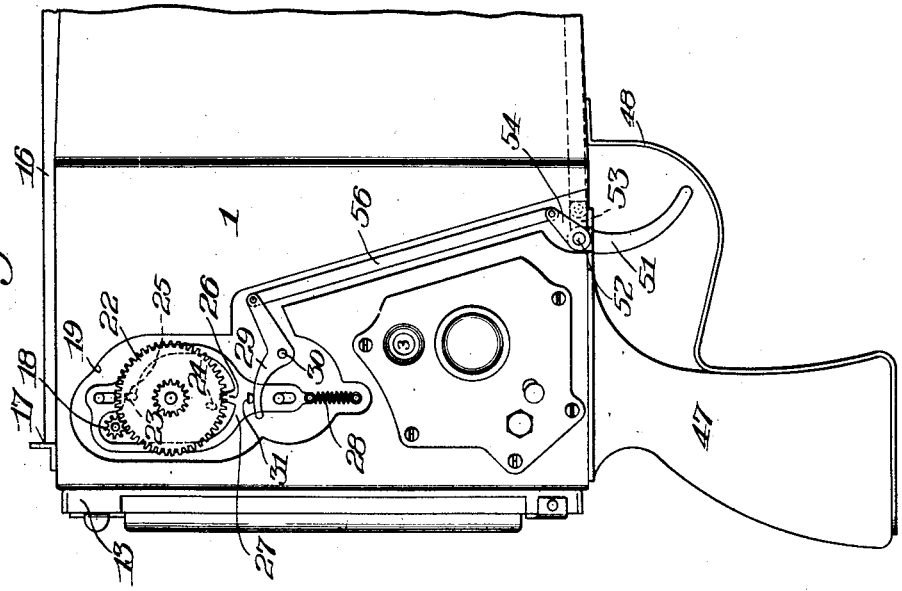
WITNESSES:
INVENTOR
William F. Folmer
BY
his ATTORNEYS

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

AVIATOR'S CAMERA.

1,236,419.     Specification of Letters Patent.     Patented Aug. 14, 1917.

Application filed April 5, 1917. Serial No. 159,851.

*To all whom it may concern:*

Be it known that I, WILLIAM F. FOLMER, of Rochester, in the county of Monroe and State of New York, have invented certain new and useful Improvements in Aviators' Cameras; and I do hereby declare the same to be a full, clear, and exact description of the same, reference being had to the accompanying drawings, forming a part of this specification, and to the reference-numerals marked thereon.

My present invention relates to photography and more particularly to photographic cameras and it has for its object to provide a simple, convenient and efficient camera particularly adapted for aviators in making photographs from aircraft or while engaged in flying. The improvements are directed in part toward providing adequate and convenient means whereby the camera can be properly supported, focused and operated under the somewhat trying conditions that such practices involve. To these and other ends the invention resides in certain improvements and combinations of parts all as will be hereinafter more fully described, the novel features being pointed out in the claims at the end of the specification.

In the drawings:

Figure 1 is a side elevation of a camera constructed in accordance with and illustrating one embodiment of my invention;

Fig. 2 is a top plan view thereof;

Fig. 3 is a central longitudinal vertical section;

Fig. 4 is a transverse section, enlarged, taken substantially on the line 4—4 of Fig. 3 and showing the forward shutter in rear elevation;

Fig. 5 is an enlarged fragmentary longitudinal section taken substantially on the line 5—5 of Fig. 4 to illustrate certain of the forward shutter actuating mechanism;

Fig. 6 is an enlarged side view of the rearward portion of the camera with certain cover plates removed to reveal part of the mechanism of the rear shutter;

Fig. 7 is a transverse enlarged sectional view taken substantially on the line 7—7 of Fig. 1 and illustrative of the diaphragm mechanism, and Fig. 8 is a fragmentary bottom view partly in section, of the rearward portion of the camera.

Similar reference numerals throughout the several views indicate the same parts.

I prefer that the general shape of the apparatus shall approximate that of a pistol or rifle and arrange for the aiming, operating and general manipulation to be carried out along these lines. The camera body 1 is relatively long, necessitated largely because of peculiarities of the long focus lens that must be employed. A chamber 2 at the front houses the lens mount 3 the tube 4 of which latter is carried in a partition 5 (Fig. 3) at the front of an exposure chamber 6. At the rear of the exposure chamber are roll chambers 7 and 8 containing, respectively, the winding off roll 9 and the tension roll 10 on opposite sides of an exposure opening 11 of a focal plane or curtain shutter 12 which may be of the usual well known construction. The curtain operates between the exposure opening 11 and the camera back 13. The camera back may be of the usual construction to receive interchangeably a roll holder or a plate holder (not shown) or the focusing screen 14 shown in Fig. 3. To properly direct the camera without focusing, it is provided on top of the body 1 with a front sight 15 on a sight rib 16 and a rear sight 17 to be used in the same manner as a gun sight.

On the shaft of the winding off roll 9 is carried a gear 18 (Fig. 6) occupying, with other mechanism, a recess 19 in a wall of the camera body 1, said recess being covered by the plates 20 and 21 (Fig. 1). This gear 18 revolves to the left as the curtain shutter is operated and drives to the right a large gear 22 with which it meshes. The large gear is provided with abutments 23 and 24 adapted to alternately engage with stops 25 and 26 on a reciprocatory escapement yoke 27 normally held in the position of Fig. 6 by a spring 28. As the escapement is vibrated, the gear 22, turning a half revolution at a time, permits, through the gear 18, the winding off roll 9 to be run down by the tension roll 10 for successive exposures all as is familiar to those skilled in the art as being the usual mode of operation of a curtain shutter.

Those movements of the escapement 27 which are against the tension of the spring 28 are effected by a bell crank 29 pivoted at 30 and engaged by a pin 31 on the escapement yoke. This engagement is maintained by the spring 28, in the present instance.

In front of the lens I provide another shutter device. This is preferably a flap shutter comprising swinging, meeting doors or flaps 32 mounted on transverse rock shafts 33 journaled in the front wall 34 of the lens chamber 2, the flaps normally closing an opening 35 in said wall. This shutter, which is opened just previously to the actual exposure, protects the lens from dust and mist and keeps the lens chamber 2 sealed. The rock shafts 33 (Figs. 4 and 5) are provided with small gears 36 meshing with racks 37 on a slotted sliding bar 38 guided on headed pins 39 within the casing 1. Flanges 40 projecting rearwardly from the front wall 34 of the lens chamber may support this bar and also the bearings of the rock shafts 33. At the lower end of the bar is a shoulder 41 on top of which rests the arm 42 of a bell crank lever having a long shaft or pivot 43 journaled in a bracket 44 on the bottom wall of the lens chamber 2. This long pivot makes the other arm 45 of the bell crank come at the center of the casing where it projects downwardly through a slot 46 in the bottom. The flaps 32 of the front shutter are normally held closed by a spring 47 that draws upwardly on the bar 38 and against the tension of which the bar is drawn down by the bell crank arm 42.

Arranged centrally beneath the rearward portion of the body or casing 1 is a hand grip 47 which is preferably in the form of a pistol grip, as shown, the same being strengthened by a trigger guard 48 extending between it and the camera body. Beneath the forward portion of the body is a front grip 49 consisting of a longitudinally extending rail spaced from the body and connected thereto by blocks 50. Adjacent to the rearward grip 47 is a trigger 51 pivoted at 52 in the bottom wall of the body (Figs. 3 and 6). This trigger has a forwardly extending arm 53 and an upwardly extending arm 54. The former is pivotally connected to the rear end of a pull rod 55 extending through the blocks 50 of the front grip and the front end of which is pivotally connected to the bell crank arm 45 of the front shutter 32. The arm 54 of the trigger is pivotally connected to the lower end of a pull rod 56 the upper end of which (Fig. 6) is pivotally connected to the bell crank 29 of the rear or curtain shutter 12.

The operation of the device is as follows:

A looped strap 57 has its ends connected to attaching rings 58 on opposite sides of the body 1 near its center and forwardly of the rear grip 47. The user places the loop of this strap around his neck, grasps the front grip 49 with one hand and the rear grip 47 with the other so that he is enabled to aim the camera as he would a rifle, and brings the sights 15 and 17 in line with his eye. This position furnishes a three point support with the two grips and the strap and the latter steadies and braces as well as supports the extended arms of the operator. The aim having been taken, the trigger 51 is pulled. Through the pull rod 55, this rocks the bell crank 45 of the flap shutter 32 at the front and opens it to the position shown in dotted lines in Fig. 3. By the same movement but after the front shutter has opened, the curtain shutter 12 is tripped by the downward pull of pull rod 56 connected to the bell crank 29 of that shutter and the exposure is made. When the trigger is released, the springs 47 and 28 of the respective shutter mechanisms return the parts to normal positions.

The dial 59 and indicator arm 60, shown in Figs. 1 and 7, constitute part of the diaphragm mechanism for regulating the lens aperture. The diaphragm blades 61 are opened and closed by the rotation of a ring 62 on the lens mount 3 which ring has a toothed portion 63 meshing with a bevel gear 64 on the shaft 65 of the indicator 60. This large indicator and dial makes it easy for the operator to set his diaphragm quickly under even the most trying conditions.

I claim as my invention:

1. In a photographic camera, the combination with a camera body, lens and shutter, of a front grip arranged forwardly beneath the body, a rear grip arranged rearwardly beneath the body, a neck strap comprising a loop having its ends attached to the body forwardly of the rear grip, a trigger adjacent to the latter and an operating connection between the trigger and shutter.

2. In a photographic camera, the combination with a camera body, lens and shutter, of a front grip arranged forwardly beneath the body and comprising spacing blocks and a longitudinal rail held thereby away from the under surface of the camera body, a rear grip arranged rearwardly beneath the body, a trigger adjacent to the rear grip and a pull rod connecting the trigger and shutter, said rod being extended longitudinally of the camera and guided between the front grip and camera body.

3. In a photographic camera, the combination with a camera body, lens and two shutters, one being a curtain shutter at the rear of the camera body and the other a flap shutter at the front thereof, of a bell crank for operating the flap shutter, a bell crank for releasing the curtain shutter, a grip beneath the camera body, a trigger arranged adjacent to the grip and having two arms and pull rods connected, respectively, to the latter and to the bell cranks.

4. In a photographic camera, the combination with a camera body, lens and a flap shutter arranged in front of the lens and comprising a pair of rock shafts provided with gears and carrying swinging, meeting flaps, of a reciprocatory rack meshing with the gears of the shutter shafts, a bell crank operatively connected to the rack to actuate the gears, a grip beneath the camera body, a trigger adjacent thereto, and a pull rod connecting the trigger and bell crank.

WILLIAM F. FOLMER.

Witnesses:
 RUSSELL B. GRIFFITH,
 AGNES NESBITT BISSELL.